H. HOWARD.
STABLE CRYSTALLINE SODIUM BISULFITE AND PROCESS OF PRODUCING SAME.
APPLICATION FILED SEPT. 6, 1912.
1,099,177.
Patented June 9, 1914.
2 SHEETS—SHEET 1.
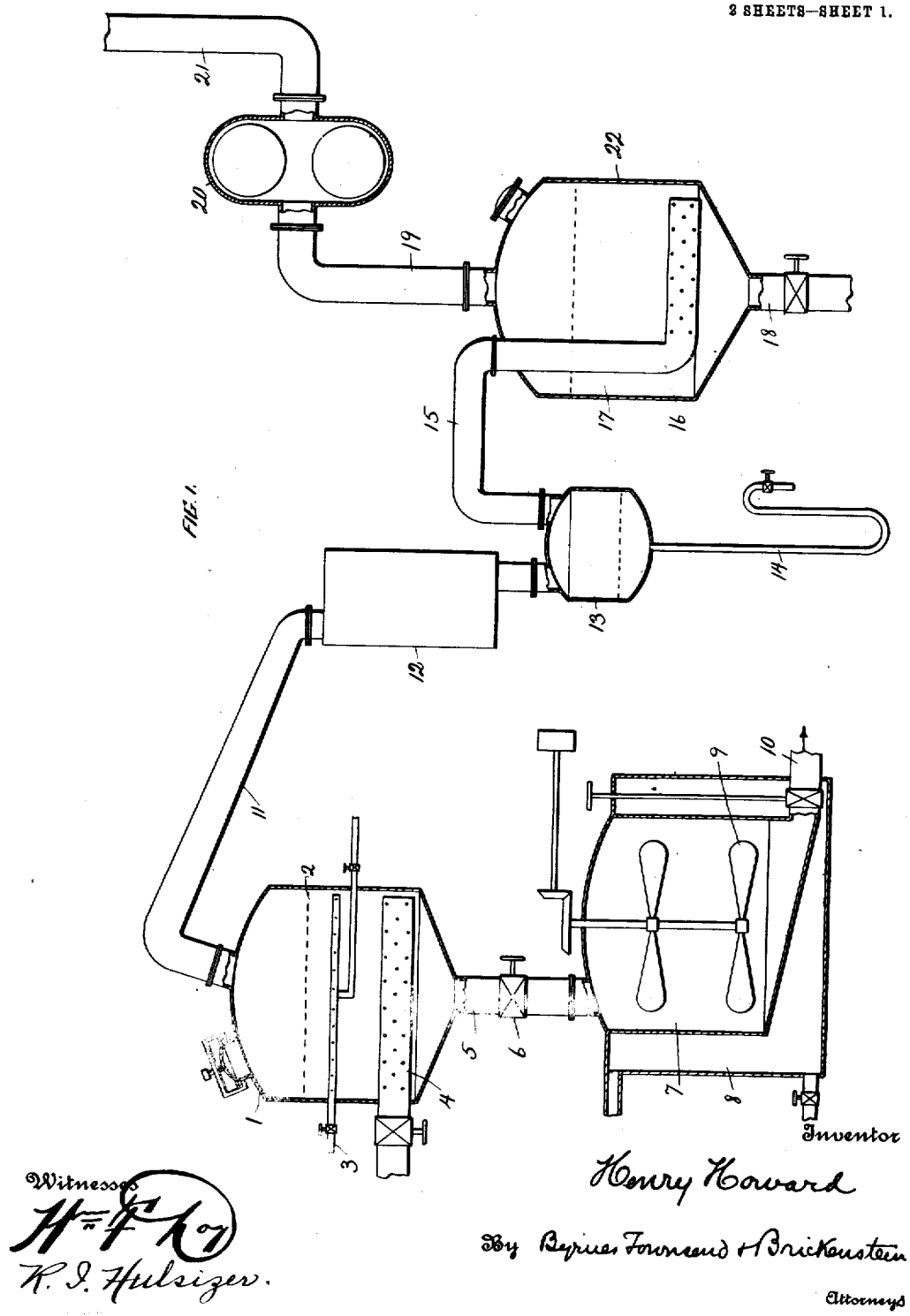

H. HOWARD.
STABLE CRYSTALLINE SODIUM BISULFITE AND PROCESS OF PRODUCING SAME.
APPLICATION FILED SEPT. 6, 1912.
1,099,177.
Patented June 9, 1914.
2 SHEETS—SHEET 2.
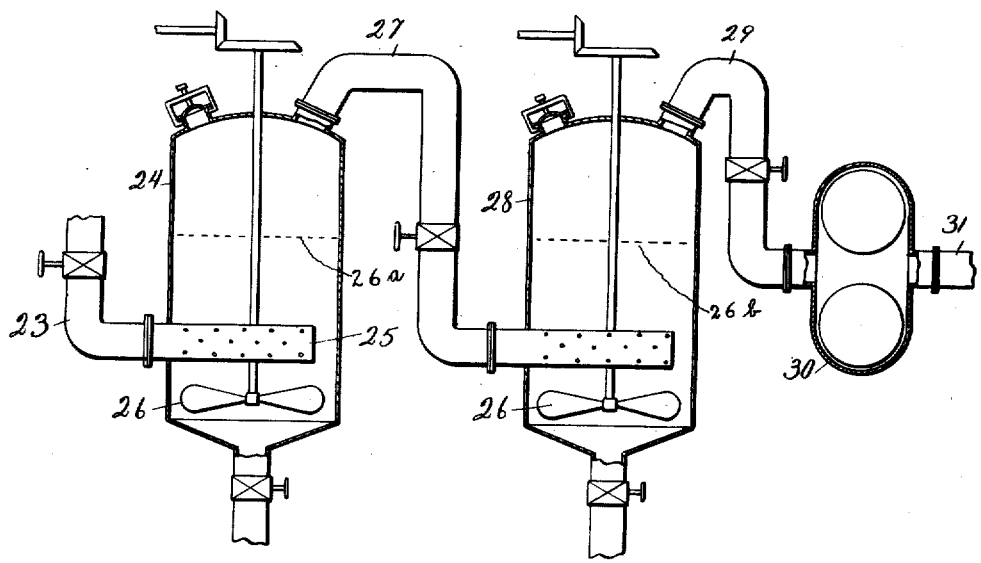
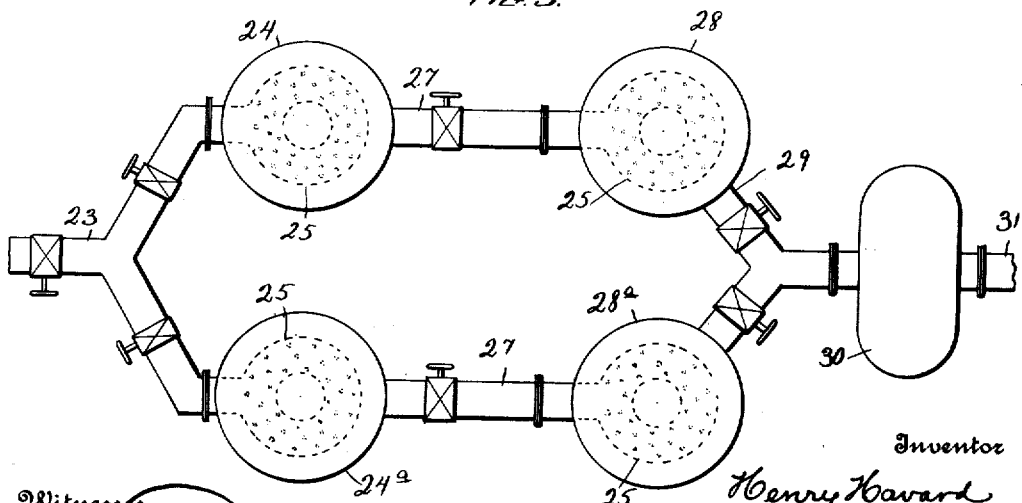

UNITED STATES PATENT OFFICE.

HENRY HOWARD, OF BOSTON, MASSACHUSETTS.

STABLE CRYSTALLINE SODIUM BISULFITE AND PROCESS OF PRODUCING SAME.

1,099,177. Specification of Letters Patent. Patented June 9, 1914.

Application filed September 6, 1912. Serial No. 718,977.

*To all whom it may concern:*

Be it known that I, HENRY HOWARD, a citizen of the United States, residing at Boston, in the county of Suffolk and State of Massachusetts, have invented certain new and useful Improvements in Stable Crystalline Sodium Bisulfite and Process of Producing Same, of which the following is a specification.

This invention relates to a stable crystalline bi-sulfite of sodium ($NaHSO_3$) and processes and apparatus for its manufacture.

Bi-sulfite of sodium has been obtained in a crystalline form by other processes, (see for example *Watts Dictionary of Chemistry*, vol. 4, edition of 1894, page 592) but the product heretofore obtained has been unstable, and rapidly decomposed. The product I obtain differs from the ordinary salt in that it is a stable crystalline salt, free from water of crystallization, and does not deliquesce or decompose when exposed to the air.

In the accompanying drawings,—Figure 1 is a plan view of the apparatus used in one process; Fig. 2 is a plan view of the apparatus used in another process; and Fig. 3 is a top view of the apparatus shown in Fig. 2, showing the tanks and connections in duplicate.

Similar reference characters refer to similar parts.

In an evaporating tank 1, Fig. 1, is contained a heated strong solution of sodium bi-sulfite ($NaHSO_3$), 2, which may also contain some sodium sulfite ($Na_2SO_3$). This solution is heated by steam coils 3, or any other suitable means, and is treated with a stream of sulfur dioxid, either pure, or as burner gas, or from any other source, passing through the perforated pipe 4. After thoroughly saturating the solution with sulfur dioxid, and evaporating until a crystalline salt begins to separate out, the heat is shut off and the passage of gas through the liquid discontinued. The solution is now run through pipe 5, containing valve 6, into the cooling and crystallizing tank 7, water-jacketed as shown at 8, and in which is a stirrer 9; further crystallization takes place, and after cooling to about atmospheric temperature the mother liquor and crystals are run through pipe 10 to a suitable filter, such as a centrifugal machine, not shown. The crystals are rapidly dried, as for example, in a vacuum drier, and then quickly cooled.

The excess of sulfur dioxid and evaporated water from evaporator tank 1, are passed through pipe 11 into condenser 12, wherein the moisture is condensed and collected and separated from the gases in separator 13, the water draining off through pipe 14. The excess of sulfur dioxid, and other gases, is passed through pipe 15, into tank 22, through perforated pipe 16, and through a suitable alkaline solution, such as sodium carbonate, 17, in which the sulfur dioxid is absorbed. The remaining gases are pumped out through pipe 19, by pump 20, and pass into the atmosphere through pipe 21. After the reaction in the evaporator 1 is complete, and the passage of sulfur dioxid discontinued, the solution 17, which should still be slightly alkaline to prevent loss of sulfur dioxid, is removed from tank 22 through outlet 18, and may be mixed with the mother liquor from the crystalline salt separated in the filter, and used for a second treatment.

A second process, illustrated by Figs. 2 and 3, is practised as follows: In a suitable tank 24, 24$^a$, containing a stirrer 26, is placed a solution 26$^a$ of sodium bi-sulfite, and which may also contain some sodium sulfite, through which is passed sulfur dioxid through conduit 23 and perforated pipe 25; with constant stirring; the reaction being carried out at ordinary temperatures. This solution may also contain an excess of sodium carbonate, which will remain suspended in the agitated liquid, and will react with the sulfur dioxid forming sodium sulfite, and then the bisulfite; the gases passing off through pipe 27. When the reaction is completed, and sodium bi-sulfite crystals form, the mass of liquid and crystals is removed quickly to a suitable filtering apparatus, such as a centrifugal machine, and the crystals quickly dried and cooled. The mother liquor is re-used in a subsequent treatment. The gases passing off through pipe 27 contain some sulfur dioxid, are passed into a second tank 28, 28$^a$, containing a suitable alkaline liquid, such as sodium carbonate, 26$^b$, preferably agitated, which absorbs all sulfur dioxid, forming sodium sulfite. The excess of gases and liberated carbon dioxid are pumped out through pipe 29 and pump 30, and passed into the atmosphere through pipe 31. The solution in tank 28, or 28$^a$, still has an alkaline reaction after the operation is completed to prevent loss of sulfur dioxid, and is added to the mother liquor from the crystals separated in the filter. Any heat generated in the reaction may be allowed to radiate into the air, or taken care of by any other suitable means. The apparatus shown in Figs. 2 and 3 is in duplicate, in order that one set may be used while the second set is being replenished. The hydrogen in the molecule sodium bi-sulfite ($NaHSO_3$) is obtained by decomposition of the water, and is replaced by the addition of water to the absorption solution in the second tank.

A third process is as follows: To a solution of sodium bi-sulfite, in tank 24, is added sodium carbonate, in preferably molecular proportions, to form neutral sodium sulfite. Heat is preferably applied to prevent material solution of the evolved carbon-dioxid which escapes and is passed through a suitable scrubber, such as tank 28, containing sodium bi-carbonate, wherein any sulfur dioxid is absorbed. The resulting gas is highly pure carbon dioxid, and may be collected in any suitable manner. The solution of sodium sulfite obtained by this reaction may be used in the "second" process.

Other alkaline bi-sulfites may be made by the above processes.

I claim:

1. A stable, crystalline salt of sodium bi-sulfite.

2. A stable, non-deliquescent, crystalline salt of sodium bi-sulfite.

3. A stable, crystalline salt of sodium bi-sulfite, free from water of crystallization.

4. A process of forming sodium bi-sulfite crystals, comprising concentrating a heated solution containing sodium bi-sulfite while passing sulfur dioxid through said solution, cooling, crystallizing, and rapidly separating, drying and cooling the crystals.

5. A process for making sodium bi-sulfite crystals, comprising passing sulfur dioxid through a heated solution containing sodium bi-sulfite until crystallization occurs, absorbing the excess of sulfur dioxid in an alkaline solution, separating the crystals of sodium bi-sulfite, drying and cooling the crystals, adding the alkaline solution containing the absorbed sulfur dioxid to the filtrate from the crystals, and passing sulfur dioxid through the mixed solutions.

6. The process for making alkaline, bisulfites, comprising passing sulfur-dioxid through a solution containing a sulfite until a bisulfite separates, absorbing the excess of sulfur-dioxid in a separate solution, recovering the separated bisulfite, adding the solution containing the absorbed excess of sulfur-dioxid to the mother liquor from the recovered bisulfite, and passing sulfur-dioxid through the mixed solutions.

In testimony whereof I affix my signature in presence of two witnesses.

HENRY HOWARD.

Witnesses:
JOSEPH W. HARRIS,
ETHEL DANIELS.

DISCLAIMER.

1,099,177.—*Henry Howard*, Boston, Mass. STABLE CRYSTALLINE SODIUM BISULFITE AND PROCESS OF PRODUCING SAME. Patent dated June 9, 1914. Disclaimer filed June 20, 1917, by the assignee, *General Chemical Co.*

Enters this disclaimer—

"To any aspect of all the claims of Letters Patent No. 1,099,177 in so far as they are capable of a construction which includes the subject-matter described and claimed in the Strickler patent, No. 1,023,179, of April 16, 1912."

[*Official Gazette July 3, 1917.*]